US011874380B2

(12) United States Patent
Lauture

(10) Patent No.: US 11,874,380 B2
(45) Date of Patent: Jan. 16, 2024

(54) METHOD, SYSTEM AND APPARATUS FOR COMMUNICATION FOR GEOLOCATION DEVICES

(71) Applicant: Eos Positioning Systems Inc., Terrebonne (CA)

(72) Inventor: Jean-Yves Lauture, Terrebonne (CA)

(73) Assignee: EOS POSITIONING SYSTEMS INC., Terrebonne (CA)

(*) Notice: Subject to any disclaimer, the term of this patent is extended or adjusted under 35 U.S.C. 154(b) by 0 days.

(21) Appl. No.: 18/125,577

(22) Filed: Mar. 23, 2023

(65) Prior Publication Data
US 2023/0305163 A1    Sep. 28, 2023

Related U.S. Application Data

(63) Continuation-in-part of application No. 18/125,362, filed on Mar. 23, 2023.
(Continued)

(51) Int. Cl.
*G01S 19/49* (2010.01)
*G01S 19/03* (2010.01)
(Continued)

(52) U.S. Cl.
CPC .............. *G01S 19/03* (2013.01); *G01S 19/48* (2013.01); *G01S 19/485* (2020.05); *G01S 19/49* (2013.01); *H04W 64/00* (2013.01)

(58) Field of Classification Search
CPC ........ G01S 10/03; G01S 19/485; G01S 19/49; H04W 64/00
(Continued)

(56) References Cited

U.S. PATENT DOCUMENTS 8,190,193 B2   5/2012  Feher
8,344,959 B2   1/2013  Autti et al.
(Continued)

FOREIGN PATENT DOCUMENTS

CA      3179881      10/2021
DE    102020000977    8/2021
(Continued)

OTHER PUBLICATIONS

International Search report, 13 pages, Giles Babin, dated May 26, 2023.
(Continued)

*Primary Examiner* — Harry K Liu
(74) *Attorney, Agent, or Firm* — Benoit&Cote Inc.; Charles-Andre Caron

(57) ABSTRACT

A method for generating a data packet for transmission over a first short-range communication channel using a first short-range communication technology is provided. The method comprises receiving a location data from a Global Navigation Satellite Systems (GNSS) port; by the GNSS receiver, simultaneously receiving a measurement data through a second short-range communication channel using a second short-range communication technology from an external measurement device; generating a data packet comprising, concurrently, the location data and the measurement data; and transmitting the data packet over the first short-range communication channel via a computer-compatible port to an electronic device paired to the GNSS receiver using the first short-range communication technology. An apparatus for determining a location of a measurement spot and a system for communication of geolocation of a measurement data are also provided.

20 Claims, 11 Drawing Sheets

Related U.S. Application Data

(60) Provisional application No. 63/322,720, filed on Mar. 23, 2022, provisional application No. 63/322,724, filed on Mar. 23, 2022.

(51) Int. Cl.
*G01S 19/48* (2010.01)
*H04W 64/00* (2009.01)

(58) Field of Classification Search
USPC .................................................... 342/357.31
See application file for complete search history.

(56) References Cited

U.S. PATENT DOCUMENTS

| | | | |
|---|---|---|---|
| 8,472,372 | B1 | 6/2013 | Dulai et al. |
| 8,583,169 | B2 | 11/2013 | Walley et al. |
| 8,879,439 | B2 | 11/2014 | Jones |
| 9,398,399 | B2 | 7/2016 | Preiszler et al. |
| 9,588,218 | B2 * | 3/2017 | Kennedy ............. G01S 19/46 |
| 10,129,165 | B2 | 11/2018 | Di Nallo et al. |
| 10,257,119 | B2 | 4/2019 | Wloczysiak et al. |
| 10,397,751 | B2 | 8/2019 | Shapiro et al. |
| 10,530,817 | B2 | 1/2020 | Jeon et al. |
| 10,627,238 | B2 | 4/2020 | Wang et al. |
| 10,901,094 | B2 | 1/2021 | Koontz et al. |
| 11,120,172 | B2 | 9/2021 | Santarone et al. |
| 11,294,976 | B1 | 4/2022 | Wittenberg et al. |
| 11,397,274 | B2 | 7/2022 | Olsson et al. |
| 2004/0204850 | A1 | 10/2004 | MacNeille et al. |
| 2011/0291882 | A1 | 12/2011 | Walsh et al. |
| 2015/0009067 | A1 | 1/2015 | Rudow et al. |
| 2016/0006577 | A1 | 1/2016 | Logan |
| 2016/0202358 | A1 | 7/2016 | Dai et al. |
| 2019/0213860 | A1 | 7/2019 | Shaprio et al. |
| 2021/0152976 | A1 | 5/2021 | Daoura et al. |

FOREIGN PATENT DOCUMENTS

| | | |
|---|---|---|
| EP | 1818889 | 8/2007 |
| EP | 2727430 | 5/2014 |
| EP | 3761142 | 1/2021 |
| WO | 2002014889 | 2/2002 |
| WO | 2022167054 | 8/2022 |

OTHER PUBLICATIONS

Eos Positioning Systems Inc., "Arrow Gold+™ Datasheet". Published Datasheet, Jul. 2021 (Jul. 2021),pp. 1-2, [online] [retrieved on May 25, 2023 (May 25, 2023)]. Retrieved from the Internet: < https://eos-gnss.com/wp-content/uploads/2021/07 /Eos-Arrow-Gold-Datasheet.pdf >.

Eos Positioning Systems Inc., "Eos Laser Mapping™for ArcGIS". Published Datasheet, 2021,pp. 1-2, [online] [retrieved on May 25, 2023 (May 25, 2023)]. Retrieved from the Internet: < https://eos-gnss.com/wp-content/uploads/2021/07/EOS Collector TP Authorized 2021e.pdf.

* cited by examiner

```
310                                                                                          312
$GPGGA,181445.00,4541.59266951,N,07338.04869631,W,2,13,0.8,18.708,M,-32.460,M,6,0,0138*4F
$GPVTG,98.13,T,112.84,M,0.06,N,0.11,K,D*10
$GPZDA,181445.00,30,12,2014,00,00*6C
$GPRMC,181445.00,A,4541.59266951,N,07338.04869631,W,0.06,98.13,301214,14.7,W,D,S*4F
$GPGSA,A,3,13,15,18,21,24,26,27,51,,,,,1.5,0.8,1.3,1*2E
$GPGST,181445.00,2.348,1.483,1.055,332.102,1.400,1.163,3.020*5B
$GNGSA,A,3,13,15,18,21,24,26,27,51,,,,,1.5,0.8,1.3,1*30
$GNGSA,A,3,65,66,75,82,,,,,,,,,1.5,0.8,1.3,4*08
$GNGSA,A,3,112,,,,,,,,,,,,1.5,0.8,1.3,4*08

$GPGGA,181446.00,4541.59267222,N,07338.04870420,W,2,13,0.8,18.698,M,-32.460,M,7,0,0138*41
$GPVTG,352.22,T,6.93,M,0.14,N,0.27,K,D*2E
$GPZDA,181446.00,30,12,2014,00,00*6F
$GPRMC,181446.00,A,4541.59267222,N,07338.04870420,W,0.14,352.22,301214,14.7,W,D,S*7C
$GPGSA,A,3,13,15,18,21,24,26,27,51,,,,,1.5,0.8,1.3,1*2E
$GPGST,181446.00,2.348,1.483,1.055,332.102,1.400,1.163,3.020*5B
$GNGSA,A,3,13,15,18,21,24,26,27,51,,,,,1.5,0.8,1.3,1*30
$GNGSA,A,3,65,66,75,82,,,,,,,,,1.5,0.8,1.3,2*37
$GNGSA,A,3,112,,,,,,,,,,,,1.5,0.8,1.3,4*08

$GPGGA,181447.00,4541.59267077,N,07338.04870873,W,2,13,0.8,18.689,M,-32.460,M,7,0,0138*48
$GPVTG,124.43,T,139.14,M,0.20,N,0.37,K,D*2E
$GPZDA,181447.00,30,12,2014,00,00*6E
$GPRMC,181447.00,A,4541.59267077,N,07338.04870873,W,0.20,124.43,301214,14.7,W,D,S*5A
$GPGSA,A,3,13,15,18,21,24,26,27,51,,,,,1.5,0.8,1.3,1*2E
$GPGST,181447.00,2.348,1.483,1.055,332.102,1.400,1.163,3.020*5B
$GNGSA,A,3,13,15,18,21,24,26,27,51,,,,,1.5,0.8,1.3,1*30
```

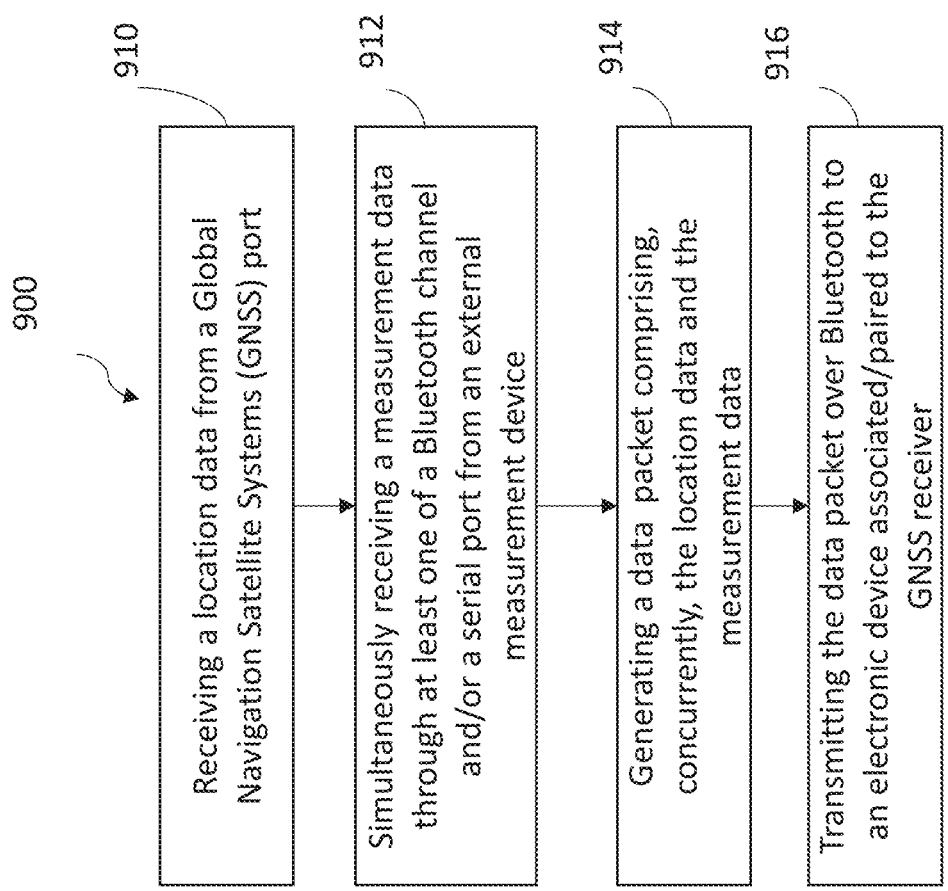

METHOD, SYSTEM AND APPARATUS FOR COMMUNICATION FOR GEOLOCATION DEVICES

RELATED APPLICATIONS

The present application is a continuation-in-part of U.S. patent application Ser. No. 18/125,362, filed Mar. 23, 2023, which claims priority to and benefit of U.S. provisional patent application No. 63/322,720 filed Mar. 23, 2022 and U.S. provisional patent application No. 63/322,724 filed Mar. 23, 2022, which are all incorporated herein by reference in their entirety.

TECHNICAL FIELD

The present disclosure relates to Global Navigation Satellite Systems (GNSS), and methods, apparatuses, and systems for communication with surrounding devices. More specifically, it relates to multiplexing for GNSS receivers.

BACKGROUND

GNSS receivers permit to determine geolocation and time information. GNSS receivers may be equipped with Bluetooth™ ports that are compatible with current Bluetooth™ technologies, such as classic Bluetooth™ and Bluetooth™ low energy. Such Bluetooth™ ports permit communication of the GNSS data to various computer devices that may collect, store and analyze data.

In some applications, GNSS receivers may need to be used with measurement devices which do not have any Bluetooth™ port or are not Apple iOS/iAP-over-Bluetooth™ compliant. Combining GNSS data with data from these measurement devices may become cumbersome.

SUMMARY

According to one aspect of the disclosed technology, there is provided a method for generating a data packet for transmission over a Bluetooth™ communication channel. In at least one embodiment, the method is for communication of a geolocation of measurements to various electronic devices. The method comprises receiving a location data from a Global Navigation Satellite Systems (GNSS) port; by the GNSS receiver, simultaneously receiving a measurement data through at least one of the Bluetooth™ channel and a serial port from an external measurement device; generating a data packet comprising, concurrently, the location data and the measurement data; and transmitting the data packet over Bluetooth™ via a computer-compatible port to an electronic device paired to the GNSS receiver. In at least one embodiment, the external measurement device is not compatible with a Bluetooth™ connectivity technology of the electronic device associated to the GNSS receiver, and the GNSS receiver is an intermediate for communication therebetween.

According to one aspect of the disclosed technology, there is provided a method for generating a data packet for transmission over a first short-range communication channel using a first short-range communication technology, the method comprising: receiving a location data from a Global Navigation Satellite Systems (GNSS) port; by the GNSS receiver, simultaneously receiving a measurement data through a second short-range communication channel using a second short-range communication technology from an external measurement device; generating a data packet comprising, concurrently, the location data and the measurement data; and transmitting the data packet over the first short-range communication channel via a computer-compatible port to an electronic device paired to the GNSS receiver using the first short-range communication technology. The external measurement device may be compatible with the second short-range communication technology of the electronic device associated to the GNSS receiver, the second short-range communication technology being different from the first short-range communication technology and the GNSS receiver is an intermediate for communication therebetween.

The method may further comprise simultaneously mapping the measurement data received from the external measurement device with the location data received from a GNSS receiver. The electronic device associated to the GNSS receiver may be installed on a handle inserted into the GNSS receiver. In at least one embodiment, the electronic device is separate and distinct from the GNSS receiver. The method may further comprise adjusting the data packet using ground positioning data received from an array of beacons, wherein each one of beacons of the array of beacons is separate and distinct from the GNSS receiver.

The method may further comprise adjusting the data packet using an inertial sensor data received from an inertial sensor located in the GNSS receiver. The method may permit adjusting and/or compensating for a tilt of the GNSS receiver when receiving the measurement data. The method may be implemented by a GNSS receiver having a GNSS port and configured to communicate with a measurement device and with a computer device, the measurement device being distinct from the computer device and the measurement device and the measurement device not being adapted to communicate with the computer device directly. The method may also comprise parsing, by a computer processor, of the received data packet to generate a map of measurements with respect to geolocation of such measurements. The method may further comprise further adjusting the data packet using laser measurement data received from a laser located in the GNSS receiver. The first short-range communication channel may be a first Bluetooth™ channel using a first Bluetooth™ technology and the second short-range communication channel may be a second Bluetooth™ channel using a second Bluetooth™ technology, the second Bluetooth™ technology being different from the first Bluetooth™ technology. In at least one embodiment, one or both of the short-range communication channels (the first communication channel and/or second communication channels) may be wi-fi communication channels, and the short-range communication technology (the first communication technology and/or the second communication technology) may be wi-fi communication technology.

According to another aspect of the disclosed technology, there is provided a method for determining a geolocation of a measurement spot, the method to be executed by a Global Navigation Satellite Systems (GNSS) receiver being in communication with an array of beacons and having a GNSS port. In at least one embodiment, the method is for communication of a geolocation to various electronic devices. The method comprises: receiving a location data from the GNSS port, along with a GNSS precision data; by the GNSS receiver, connecting to the array of beacons, wherein each one of beacons of the array of beacons is separate and distinct from the GNSS receiver, and each one of the beacons is installed at a pre-determined beacon location; determining a beacon-based location of the GNSS receiver within the array of beacons (for example, using at least one of triangulation and signal intensity), which is determined without GNSS technology, along with a beacon estimated precision data; generating a data packet having the location data received from the GNSS port, comprising replacing the location data from the GNSS port in the data packet by the beacon-based location of the GNSS receiver if the beacon precision data is more accurate than the GNSS precision data; and transmitting the data packet over an output port (for example, Bluetooth™ port) to an electronic device associated to the GNSS receiver, the electronic device being separate and distinct from the GNSS receiver.

The electronic device associated to the GNSS receiver may be installed on a handle inserted into the GNSS receiver. The method may further comprise measuring a distance to the measurement spot located on the ground and, based on the distance, adjusting the location data. The method may further comprise adjusting the data packet based on an inertial sensor data received from an inertial sensor located in the GNSS receiver. The method may further comprise adjusting the data packet based on a distance between the receiver and the measurement spot, the distance being determined based on a laser measurement data received from a laser located in the GNSS receiver. In at least one embodiment, connecting to the array of beacons is in response to the GNSS precision data indicating that the location data received from the GNSS port needs to be corrected. In other terms, connecting to the array of beacons may be in response to the GNSS precision data indicating that the location data received from the GNSS port is not sufficiently (for example, within a pre-determined threshold) precise.

According to a further aspect of the disclosed technology, an apparatus (also referred to herein as a "GNSS receiver") for determining a location of a measurement spot is provided. In at least one embodiment, the apparatus is for determining and communication of a geolocation of a measurement to various electronic devices. The apparatus comprises: a GNSS port; a channel port configured to communicate with a measurement device and generate measurement data; a computer-compatible port configured to communicate with a computer device, the measurement device being distinct from the computer device and the measurement device and the measurement device not being adapted to communicate with the computer device directly; and a microcontroller configured to: receive, from the GNSS port, a GNSS data; generate a merged data packet comprising the GNSS data and the measurement data; and transmit the merged data packet to the computer device. The apparatus may further comprise an inertial sensor configured to measure an inertial sensor data and wherein the microcontroller may be further configured to adjust the merged data packet based on the inertial sensor data. The apparatus may further comprise a laser configured to measure a distance between the apparatus and the measurement spot and wherein the microcontroller may be further configured to adjust the merged data packet based on a laser measurement data received from the laser. The apparatus may further comprise a handle comprising a device socket for mounting the computer device associated to the apparatus. The method and apparatus may be used to generate a map of a distribution of measured data with respect to geolocation of the corresponding measurements. The method and apparatus may be used to detect (measure) a chemical and to position the measurement device used for detection on a map. The method as described herein may be used for geolocation devices.

According to a further aspect of the disclosed technology, a system for communication of geolocation of a measurement data is provided. In at least one embodiment, the system comprises: a Global Navigation Satellite Systems (GNSS) port configured to generate a geolocation data comprising a sequence of information blocks; a first port configured to communicate with an electronic device using a first communication technology, a second port configured to communicate with a measurement device using a second communication technology and to generate the measurement data, the measurement device being distinct from the electronic device, and the first communication technology being incompatible with the second communication technology; and a microcontroller configured to: generate a data packet based on the geolocation data having the sequence of the information blocks; in response to receiving the measurement data from the second port, generate a measurement data block and adjust the data packet by inserting the measurement data block between two sequential information blocks the of the sequence of information blocks; transmit the data packet to the second port for transmission to the electronic device.

In at least one embodiment, the system further comprises an inertial sensor and a laser, and wherein the microcontroller is further configured to generate a tilt data block based on the inertial sensor data the and the laser measurement data and to adjust the data packet by inserting the tilt data block. In at least one embodiment, each information block has an information block timestamp, the measurement data having a measurement timestamp, and the information block timestamp of the first information block being simultaneous with or within a pre-determined time period from the measurement timestamp. The system may further comprise a computer device processor configured to parse the data packet and generate a visual representation of the measurement data with respect to a measurement location for displaying on a display of the electronic device. The system may further comprise a third port configured to communicate with an array of beacons, wherein the microcontroller may be configured to generate a beacon-based position data and to adjust the data packet based on the beacon-based position data.

A method for generating a data packet for transmission over Bluetooth™ and an apparatus for determining a location of a measurement spot are provided herein. In at least one embodiment, the method is for communication of geolocation to various electronic devices. In at least one embodiment, the method comprises receiving the location data from the GNSS port; by the GNSS receiver, simultaneously receiving the measurement data through at least one of a Bluetooth™ channel and a serial port from an external measurement device; generating a data packet comprising, concurrently, the location data and the measurement data; and transmitting the data packet over Bluetooth™ via a computer-compatible port to an electronic device paired to the GNSS receiver. A method for determining a geolocation of a measurement spot, the method to be executed by a GNSS receiver being in communication with an array of beacons and having a GNSS port are also provided.

A method for generating a data packet for transmission over a first short-range communication channel using a first short-range communication technology is provided. The method comprises receiving a location data from the GNSS port; by the GNSS receiver, simultaneously receiving a measurement data through a second short-range communication channel using a second short-range communication technology from an external measurement device; generating a data packet comprising, concurrently, the location data and the measurement data; and transmitting the data packet over the first short-range communication channel via a computer-compatible port to an electronic device paired to the GNSS receiver using the first short-range communication technology. An apparatus for determining a location of a measurement spot and a system for communication of geolocation of a measurement data are also provided.

BRIEF DESCRIPTION OF THE DRAWINGS

Further features and advantages of the present disclosure will become apparent from the following detailed description, taken in combination with the appended drawings, in which:

FIG. 3B illustrates a non-limiting example of GNSS data of FIG. 3A, in accordance with at least one embodiment of the present disclosure;

FIG. 9 illustrates a method for generating a data packet for communication for geolocation devices, in accordance with at least one embodiment of the present disclosure.

It will be noted that throughout the appended drawings, like features are identified by like reference numerals.

DETAILED DESCRIPTION

Figure 1:
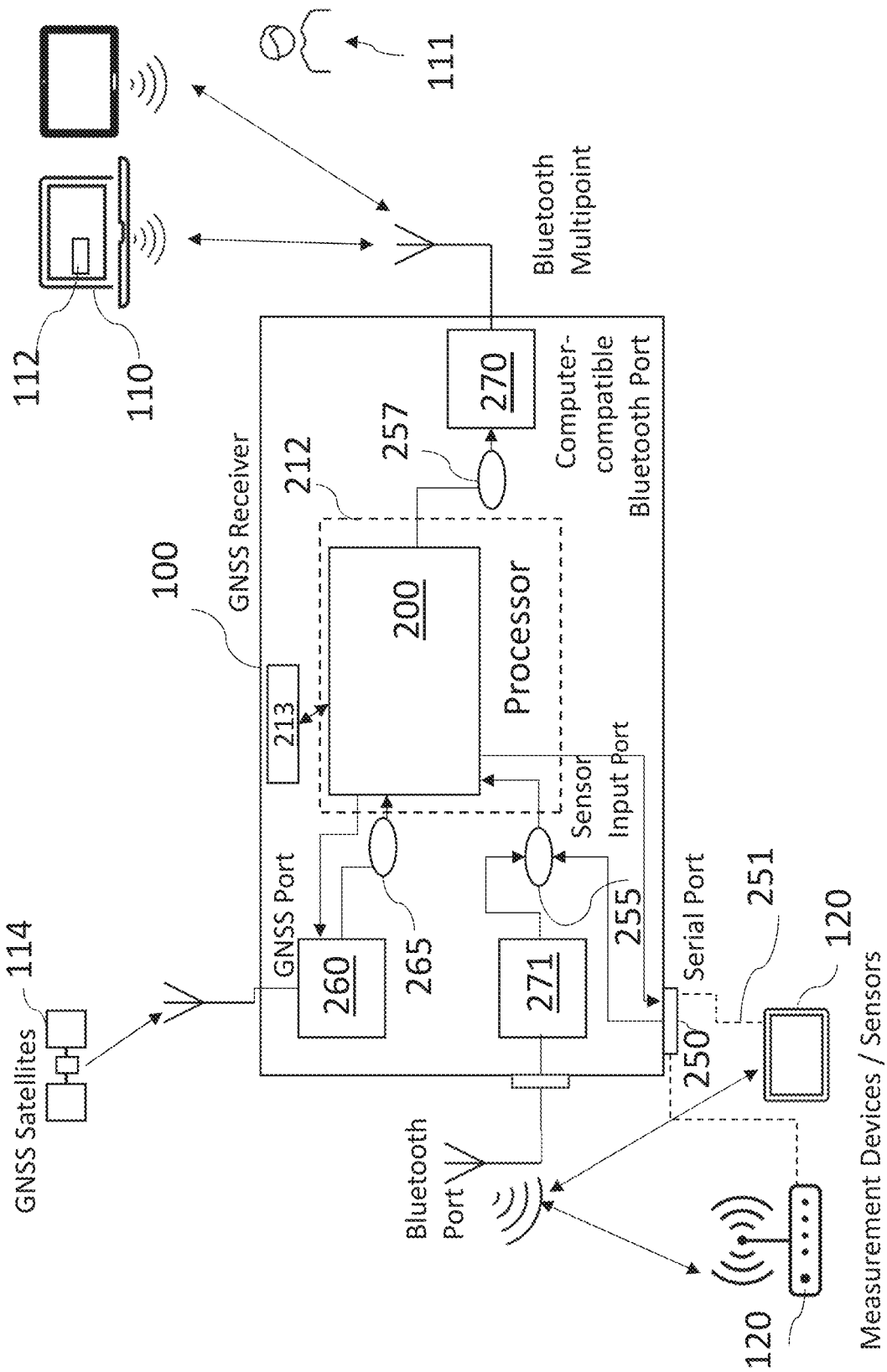
FIG. 1 depicts a GNSS receiver with a built-in multiplexer in accordance with the embodiments of the present disclosure.

Various aspects of the present disclosure generally address one or more of the problems of communication of the various measurement devices with computer devices because of different communication technologies.

The present description provides a system, an apparatus, and a method for the multiplexing of Bluetooth™ and serial port sensor data with the Global Navigation Satellite Systems (GNSS) receiver data within the GNSS receiver itself. In addition to conventional GNSS antenna and GNSS communication port, a multiplexer is installed inside the GNSS receiver body or housing.

Multiplexing as referred to herein is the simultaneous electronic transmission of two or more messages in one or more directions over a single transmission path. The acronym GNSS as used herein may comprise the U.S. GPS constellation alongside the Russian Global Navigation Satellite System (GLONASS), the European Galileo, the Chinese BeiDou, the Japanese Quasi-Zenith Satellite System (QZSS), and the Indian Indian Regional Navigation Satellite System (IRNSS) constellations.

Devices with Global Navigation Satellite System (GNSS) can determine geolocation information. While GNSS receivers can be embedded in various electronic devices such as smartphones, the present disclosure relates mainly to professional-grade or dedicated GNSS receivers (standalone GNSS receivers and not those embedded in other consumer electronics such as smartphones) for which use cases may include land surveying, civil engineering, mapping, topographic measurements, forestry, road building, wildland exploration, etc. Such GNSS receivers typically have a very high precision (from submeter to centimeter accuracy) and are adapted to a professional use (engineering/construction, geography, etc.).

These GNSS receivers are normally provided as handheld devices, pole-mounted devices or attachable devices to be attached on personal equipment such as on a backpack. They are used for specific GNSS measurements that can be read either directly thereon or via an electronic device (computer, smartphone, tablet, etc.) which is paired thereto.

There is provided a GNSS receiver (which sometimes also referred to as a GNSS device) with Bluetooth™ multiplexing technology implementing a hub for external sensors or indoor positioning capabilities. Such a GNSS receiver allows for the communication between the external sensors, or other measurement devices distinct and separate from the GNSS receiver 100, and a computer device 110 (also referred to herein as an "electronic device 110") such as a computer, smartphone, laptop, iPad or a tablet, also distinct and separate from the GNSS receiver 100. FIGS. 1, 4-7B illustrate various embodiments of the GNSS receivers 100, 500, 700 and 701, in accordance with the present disclosure.

An additional serial port is added to the GNSS receiver. This serial port may permit to receive additional information from legacy (non-Bluetooth) measurement devices or sensors and to transmit such information to the computer device at the same time or in sequence it would transmit the GNSS location data to the same computer. In other words, the technology described herein permits the multiplexer in the GNSS receiver to enable communication between the measurement devices (or sensors) and to transmit data from these measurement devices to the computer device(s). The GNSS receiver, due to its multiplexer, can play an intermediate role between the computer device and other measurement devices which do not have appropriate or available communication channels with the computer device, e.g., due to an incompatibility in the technology generations of the devices. For example, external measurement devices may not be able to communicate over a Bluetooth™ link with computing devices of a given type, such as computing devices having the iOS™ operating system. Using the GNSS receiver as an intermediate device can ensure that the communication is made from the external measuring device to said electronic device having an incompatibility, indirectly by communication through the GNSS receiver.

Referring now to the drawings, FIG. 1 depicts a GNSS receiver 100 with a multiplexer 200 (which may also be referred to as a "microcontroller 200") in accordance with the embodiments of the present disclosure. The GNSS receiver 100 is in communication with computer devices 110 and GNSS satellites 114. The computer devices 110 may be a computer, a laptop, an iPad or a tablet, or any other device that has a Bluetooth™ transceiver, an input/output periphery, a display, a computer device processor and a memory. The computer devices 110 are configured to receive the data in Bluetooth™ protocol from the GNSS receiver 100, store it in the computer memory and retrieve it for a user 111 when requested. Each one of the computer devices 110 has a computer device memory (not depicted) which stores instructions for execution by a computer device processor.

In at least one embodiment, the GNSS receiver 100 as described herein is configured to provide cartographical data concurrently (i.e., simultaneously, in combination with, or along) with respect to various measurements performed by measurement devices 120. The measurement device 120 may be an external measurement device which may be separate and distinct from the GNSS receiver 100. For example, the measurement devices 120 may perform measurements and localization of a chemical (for example, methane) in a specific area. Other measurement devices 120 may include measurement instruments for meteorological conditions such as temperature, humidity, wind speed, etc., other physical parameters such as lighting intensity, radiation intensity, sound intensity, water depth, or data from an underground pipe locator, etc.

In the first example, based on the detected level of the chemical in the area, and based on the GNSS positioning data, the computer device 110 may provide a map of the chemical distribution in the area. To obtain (to generate and to display) an accurate map of the distribution of the chemical, simultaneous detection of the chemical and positioning of the measurement device 120 need to be performed.

In other non-limiting example, the measurement device 120 may be a gamma camera (also referred to as "gamma scanner") used to image gamma radiation emitting radioisotopes. In such a case, the combination of the GNSS receiver 100 and such gamma camera may provide a map of radiation measured in the area depending on the GNSS position/location.

Conventional measurement devices do not have an embedded GNSS receiver 100 and a processor that would be able to provide a position simultaneously with the measurements. Moreover, many measurement devices 120 do not have a Bluetooth™ port that would be compatible with contemporary computer devices, such as computer devices 110. In particular, a conventional measurement device 120 may have a serial port. Alternatively, the conventional measurement device 120 may have a Bluetooth™ serial port profile (SPP) (so-called "classic Bluetooth™"). Such technology may not be compatible with the latest Bluetooth™ versions of the computer devices 110. The measurement devices 120 that communicate with the GNSS receiver 100 as described herein may be not compatible with a Bluetooth™ connectivity technology of the electronic device(s) 110 associated to the GNSS receiver 100, and the GNSS receiver 100 may be used as an intermediate for communication between the measurement devices 120 and the computer devices 110.

Still referring to FIG. 1, the GNSS receiver 100 has at least four communication ports: a serial port 250, a computer-compatible port 270 (also referred to herein as "computer-compatible Bluetooth™ port 270" or a "first port" that uses a first communication technology), a dedicated sensor Bluetooth™ channel port 271 (also referred to herein as a "second port" that uses a second communication technology), and a GNSS port 260 (which may also be referred to as a "GNSS sensor" or "GNSS chipset" or "GNSS engine"). The serial port 250 and the Bluetooth™ sensor port 271 are configured to communicate with measurement devices 120. The GNSS port 260 includes an antenna for communicating with the GNSS satellites 114.

In some embodiments, the serial port 250 may be connected to the measurement devices via a cable 251. The Bluetooth™ sensor port 271 may be connected to a sensor 120 wirelessly using Bluetooth™ protocols. Alternatively, the serial port 250 may connect to the measurement devices 120 wirelessly using protocols/profiles other than Bluetooth™.

The channel port 271 (which may be also referred to as an "input port 271") for multi-point communication with external sensors 120 and the computer-compatible port 270 which communicates with the computer devices 110 (and may be referred to as an "output port 270") are illustrated as two boxes/ports, while they may be preferably implemented as one Bluetooth™ port with two channels of communication, where the channel port 271 would communicate via one communication (Bluetooth™) channel and the computer-compatible port 270 would communicate with computer devices 110 over another Bluetooth™ channel.

The computer-compatible port 270 is configured to communicate with computer devices 110 using Bluetooth™ protocol proper to Windows, iOS™ or Android™ mobile operating systems. Thus, GNSS receiver 100 may play a function of an intermediate device between the measurement devices 120 and the computer devices 110 when the measurement devices 120 cannot communicate with the computer devices 110 on their own.

Bluetooth™ technology referred to herein is a non-limiting example of a short-range communication technology. In at least one embodiment, a first short-range communication technology (such as, for example, and not limited to, Bluetooth™ protocol proper to electronic devices 110) used by the first port 270 may be incompatible with a second short-range communication technology (such as, for example, and not limited to, Bluetooth™ protocol proper to measurement devices 120 or a serial port 250) used by the second port 271. The GNSS receiver 100 as described herein permits the communication of a geolocation of measurements executed by the measurement devices, in addition to providing the intermediate between the measurement device(s) 120 and electronic devices 110. The technology as described herein may be used for transmission using short-range communication channels, such as, for example, various Bluetooth™ communication technologies and channels, which are not compatible with each other. A first short-range communication channel may be, for example, and without limitation, a first Bluetooth™ channel using a first Bluetooth™ technology for transmission via the first port 270. A second short-range communication channel may be, for example, and without limitation, a second Bluetooth™ channel using a second Bluetooth™ technology for transmission via the second port 271. the second Bluetooth™ technology being different from the first Bluetooth™ technology.

In at least one embodiment, the multiplexer 200 is configured to merge the measurement data 255 received from the measurement device(s) 120 and the GNSS signal 265 received from the GNSS port 260. The GNSS data 265 comprises the position of the GNSS receiver 100 recalculated by a conventional GNSS technology based on the data received from the GNSS satellites 114.

The multiplexer 200 is configured to receive, analyze, and merge the sensor data 255 and GNSS data 265 to generate a multiplexed data stream 257 (also referred to herein as "merged data 257" or "data packet 257") in a computer-compatible format. Such merged data 257 is compatible with the Bluetooth™ protocol of the computer devices 110 as described above.

It should be understood that when referred to herein, the Bluetooth™ technology, protocols and packets may refer to classic Bluetooth™ technology, as well as Bluetooth™ Low Energy technology. In some embodiments, the measurement devices 120 may be equipped with Bluetooth™ Low Energy technology, while the computer devices 110 may be equipped with the Bluetooth™ Classic technology only. The methods and apparatuses as described herein may permit multiplexing GNSS data with various data (received from series port of other non-Bluetooth™ or Bluetooth™ classic port) to generate one type of Bluetooth™ classic or Bluetooth™ Low Energy data packets.

Figure 2:
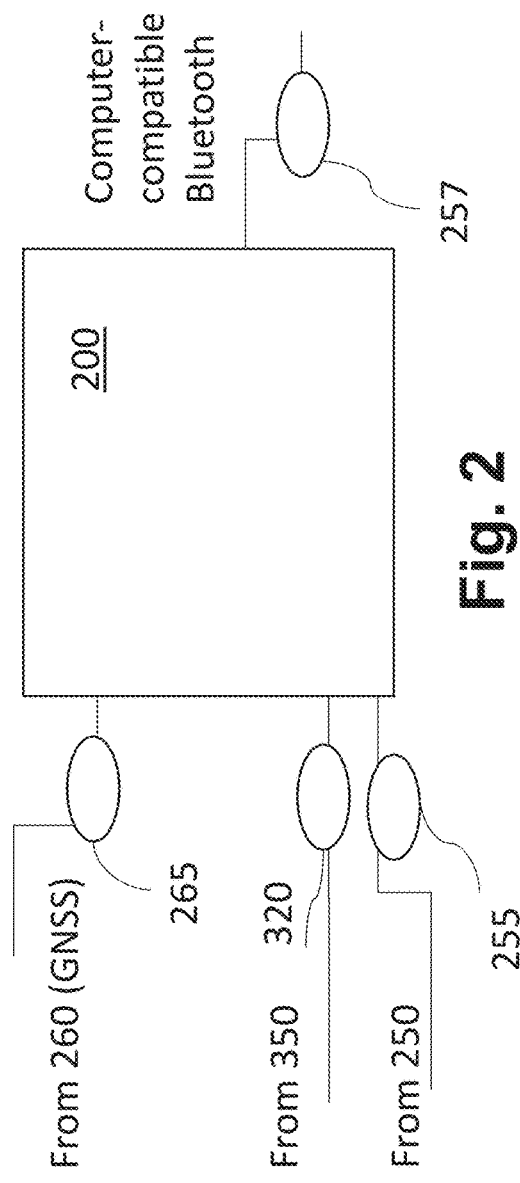
FIG. 2 depicts a multiplexer of the GNSS receiver of FIG. 1 (or FIG. 4 below)

Referring now to FIG. 2, the multiplexer 200 is in communication with data communications ports. The multiplexer 200 manages data inputs and outputs into and from said data communications ports. The multiplexer 200 is located in the GNSS receiver 100. The multiplexer 200 may be part of a larger processor 212 (FIG. 1) located in the GNSS receiver 100 and having other electronic elements which ensure it can perform the geolocation measurements and can communicate the data. The receiver 100 also has a receiver memory 213 that is configured to store instructions to be executed by the multiplexer 200 (processor 212) to implement the methods described herein.

Figure 3A:
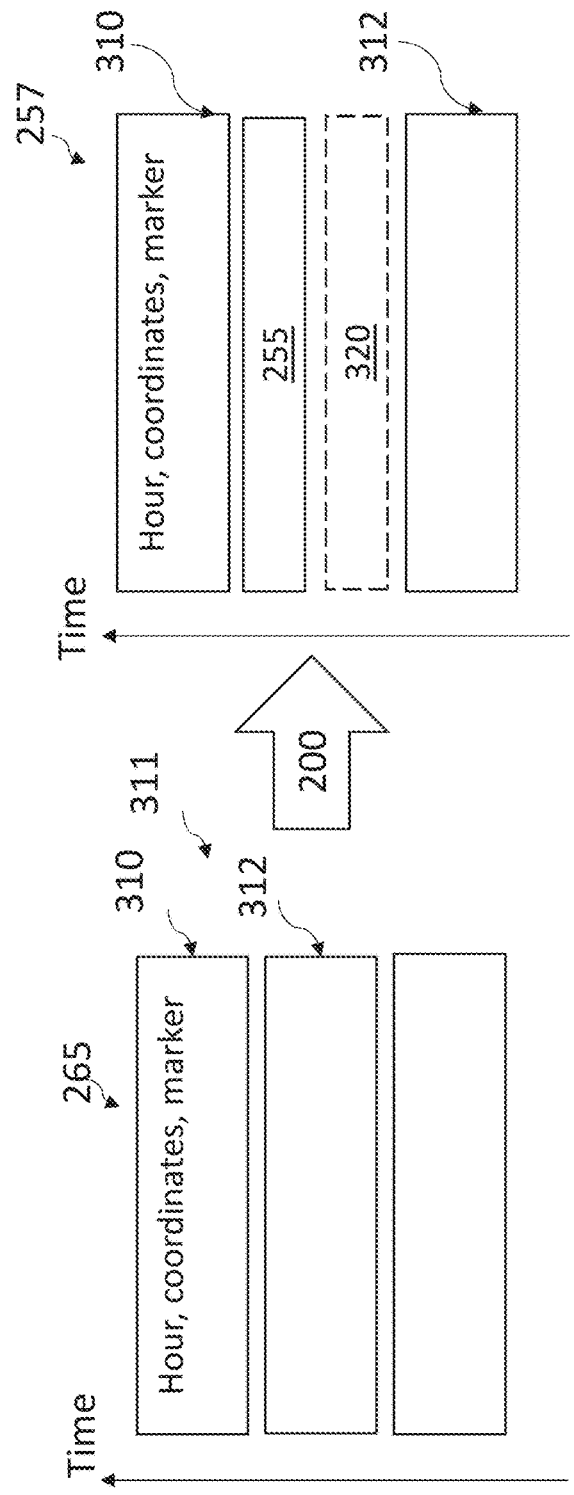
FIG. 3A schematically illustrates data received by the multiplexer of FIG. 2 and data packet generated and transmitted using the method as described herein, in accordance with at least one embodiment of the present disclosure.

A typical GNSS data 265 received from the GNSS port 260 is schematically illustrated in FIG. 3A. Every second, for example, the GNSS port 260 generates GNSS data 265 which may be a string (or several strings forming a text), or a binary file, that has information comprising a talker identification (ID), time of the measurement of the coordinates, coordinates (positioning) of the receiver 100, and a marker 901 (which may be referred to as a "quality indicator") identifying whether the measurement was successful.

FIG. 3B illustrates a non-limiting example of GNSS data 265 as strings that may be generated every second (or more frequently) by the GNSS sensor 260 (chipset) and received by the multiplexer 200, in accordance with at least one embodiment. The GNSS data 265 comprises information blocks 311, such as the first information block 310 and the second information block 312. The marker 901 identifies whether the measurement of the location (geolocation positioning) was successful. For example, the measurement is considered to be not successful if the GNSS port 260 could not connect to a GNSS satellite 114. The marker 901 may be an integer and may be, for example, "2" when the measurement has been successful, and may be, for example, "0" when the measurement has not been successful.

Figure 4:
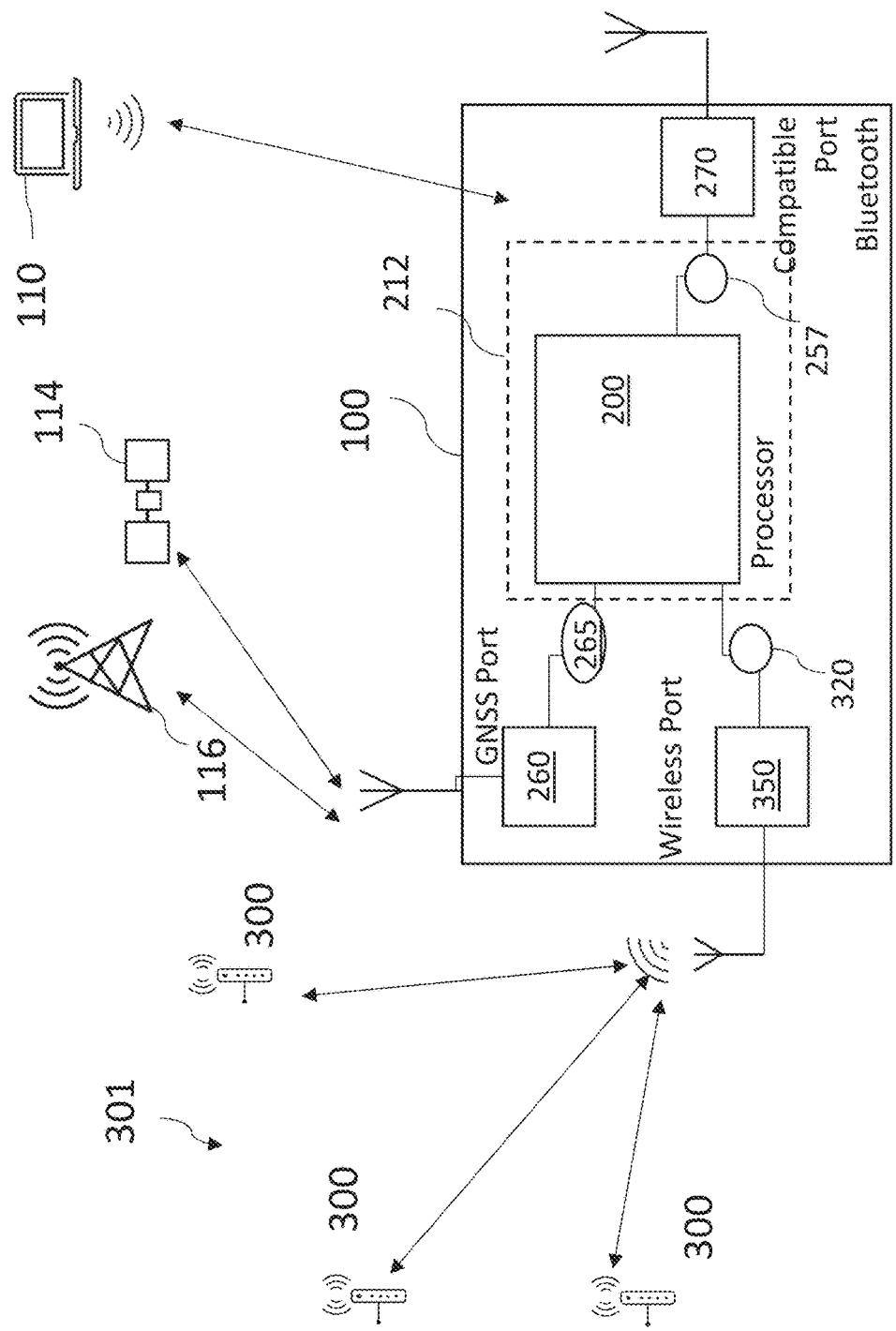
FIG. 4 depicts the GNSS receiver in communication with local positioning devices, in accordance with at least one embodiment of the present disclosure.
Figure 5:
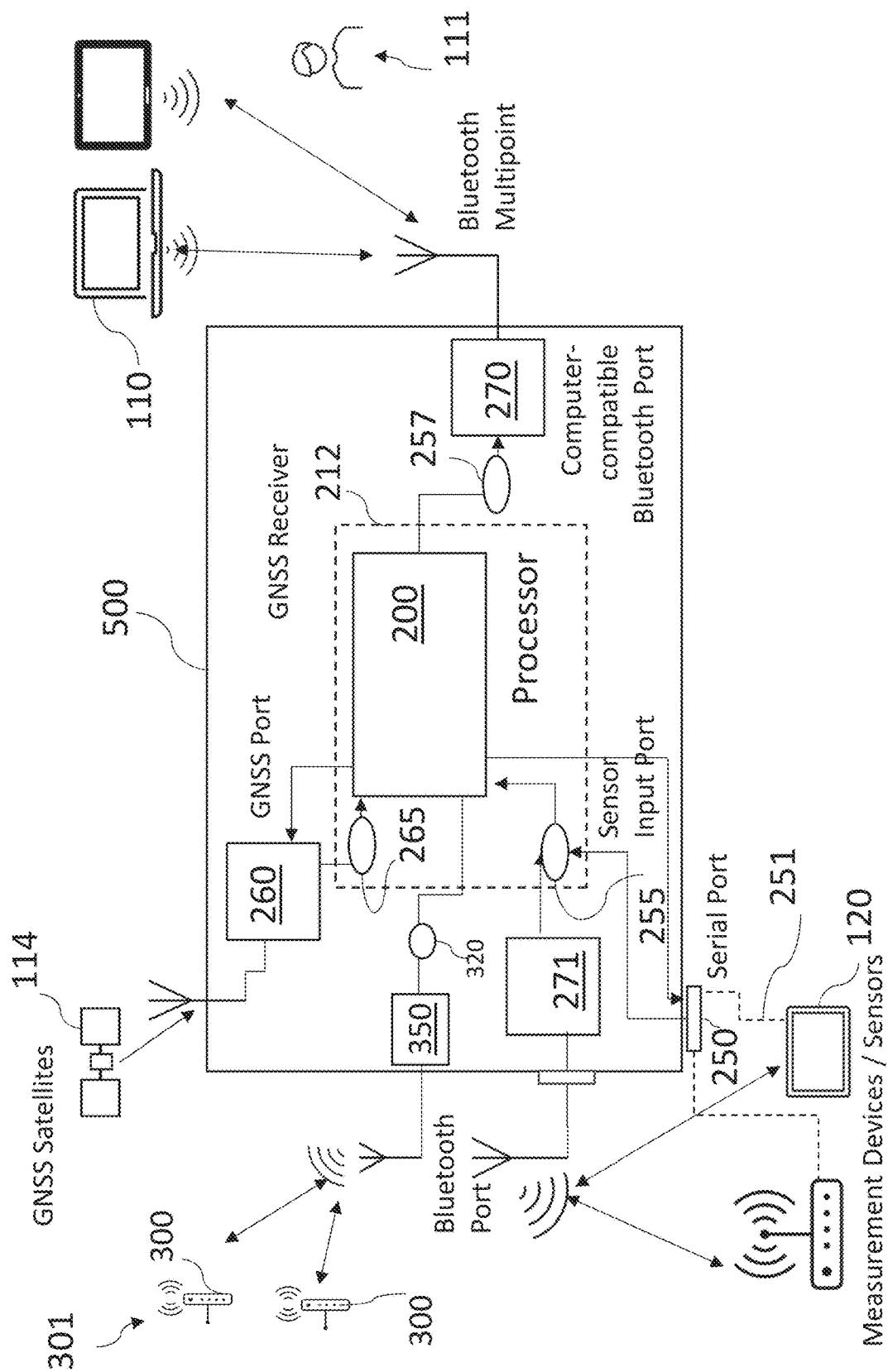
FIG. 5 illustrates the GNSS receiver, in accordance with another embodiment of the present disclosure.

Based on the marker 901, the processor 212 of the GNSS receiver 100 (also referred to herein as a "receiver processor 212") may then, for example, decide to correct or not the coordinate provided by the GNSS sensor 260, as described herein below. For example, if the measurement has not been successful, in the embodiment of the receiver 100 that has the local positioning devices, the processor 212 may, instead of sending the GNSS data 265 towards the Bluetooth™ computer-compatible port 270, send a ground positioning data 320 received from the local positioning devices 300, as illustrated in FIGS. 4-5 and described below, for example.

Referring to FIGS. 3A and 3B, the information blocks 311 (such as the first information block 310 and the second information block 312) may comprise other metadata. The GNSS port 260 may generate such GNSS information blocks 311 many times during one second—for example, 5 times during one second. As referred to herein, a time period related to the first information block 310 refers to a time period which comprises the time stamp of the first information block 310 and time difference between the first and the second information blocks 310, 312. In other terms, time period related to the first information block 310 corresponds to the time difference between time stamps of two information blocks received by the receiver processor 212.

The channel port 271 or the serial port 250 may receive the measurement data 255 from the measurement devices and/or sensors 120. The measurement data 255 may be received by the multiplexer 200, for example, every 30 seconds. The computer-compatible port 270 transmits (sends to the computer devices 110) the GNSS data 265, within the merged data 257, every time when the multiplexer 200 receives the GNSS data 265 from the GNSS port 260.

Figure 3C:
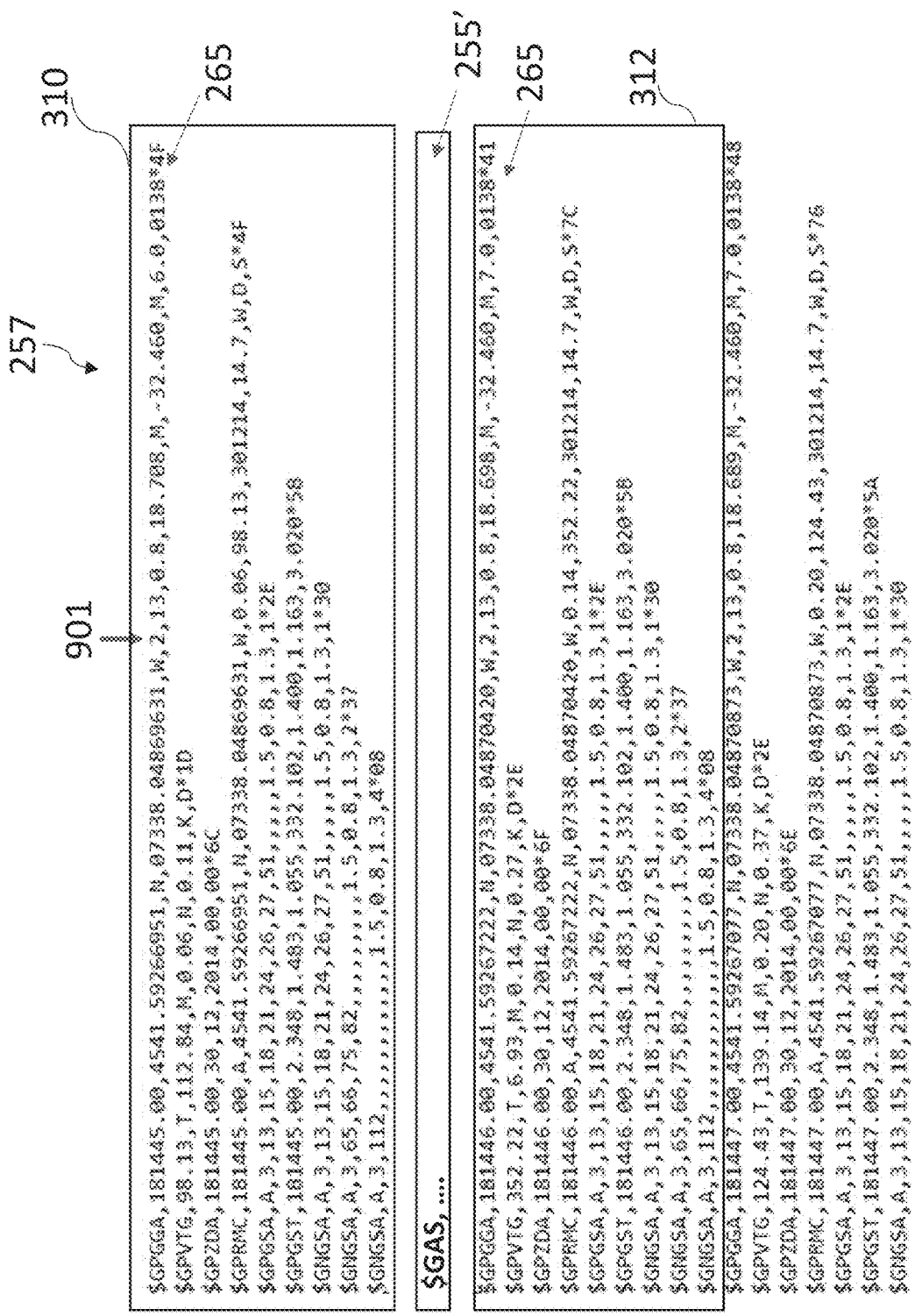
FIG. 3C illustrates a non-limiting example of a data packet (also referred to herein as "merged data" or "merged data packet") for Bluetooth™ communication of FIG. 3A, in accordance with at least one embodiment of the present disclosure.

As soon as the receiver processor 212 receives the measurement data 255 (which may arrive less frequently than the GNSS data 265), the measurement data 255 is added at the end of the (in other terms, appended to the) GNSS data 265 and then transmitted, as a part of the merged data 257, towards the computer devices 110. A non-limiting example of the merged data 257 is depicted in FIG. 3C. If no measurement data 255 was received at the same time as or within a pre-determined time period prior to the reception of the first information block 310 of the GNSS data 265, the merged data 257 has the first information block 310, followed by the second information block 312, as received initially from the GNSS port 260. In some embodiments, the GNSS data 265 needs to be corrected by or replaced with, as described below, ground positioning data 320 received from a wireless port 350 (also referred to herein as a "third port") in communication with local positioning devices 300.

For example, the multiplexer 200 may modify the GNSS data 265, before transmitting of the merged data 257 to the computer-compatible port 270. It should be understood that the merged data 257 may be transmitted instantaneously, or extended over a period of time, where the merged data 257 is the data that is transmitted over a certain period of time. With reference to FIG. 3A, in merged data 257, the first information block 310 of the GNSS data 265 is followed in time by the measurement data 255 and then followed, in time, by the second information block 312. Alternatively, the GNSS data 265 may be transmitted simultaneously with the first information block 310. In other words, the string of GNSS data 265 may be added to the series of strings of first information block 310 and transmitted simultaneously with the first information block 310. Alternatively, one of the strings of the first information block 310 may be modified and such a modified information block may be generated and then transmitted within the merged data 257.

Each data packet of the measurement data 255 received from the port 271, is added right after the end of the information block 310 of the GNSS data 265. The multiplexer 200 executes a microcontroller-embedded software, which manages the software and the Bluetooth™ technology and ports, and executes instructions (tasks). Some of such instructions add (append) measurement data 255 at the end of GNSS data 265 each time the multiplexer 200 receives the measurement data 255. The microcontroller 200 can (in other words, is configured to) thus manipulate with the data and administrate the received data.

In some embodiments, the multiplexer 200 may first convert the measurement data 255 to a measurement data string 255' which starts with a sensor-specific identifier (which may be also referred to as a talker identification or a string header, such as, for example, a gas sensor may be identified as "$GAS" or a tilt sensor may be identified as "$TILT") and then add the measurement data string 255' right after the first information block 310, as illustrated in FIG. 3C.

The computer device 110 may have a computer device software (in other words, instructions stored in a computer device memory, the instructions for execution by a computer device processor 112). The computer device 110 is configured to receive the merged data 257 via the computer-compatible port 270 and to determine where the GNSS data 265 is and where the measurement data 255 is by distinguishing them. In other words, the computer device processor 112 is configured to execute the instructions to parse the merged data 257 received from the GNSS receiver 100 to determine the measurement data 255 and its corresponding location data. The method as described herein therefore simultaneously maps the measurement data 255 from the external measurement device 120 with the location data corresponding to the measurement data 255.

For example, the computer device processor 112 of the computer device 110 may color-code maps based on the data received from the computer-compatible port 270. In other words, the computer device processor 112 of the computer device 110 may, by execution of instructions stored in the computer memory, generate color-coded maps, where the measurement data 255 is represented based on and mapped to the location data, and wherein both the measurement data 255 and the location data were received in the merged data 257 for each location. The computer device processor may parse the data packet (merged data 257) and generate a visual representation of the measurement data with respect to a measurement location (in other terms, a location where the measurement was executed). In at least one embodiment, the computer device processor 112 may then display (initiate displaying of) the generated the color-coded map or other visual representation of the measurement data mapped to the geolocation (map) on a display 113 of the computer device 110.

For example, a map with a color code of a gas as a result of a gas leak, for example, may be generated. The geolocation data and the gas measurement data may be therefore received in the merged data 257 by the computer device processor 112 and used together to generate a gas leak map.

The data packet merged data 257 is transmitted periodically to the computer device 110, when the Bluetooth™ connection is established. The multiplexer 200 also receives the measurement data 255 and adds the measurement data 255 after each GNSS information block 310, which corresponds to the time (timing, or moment) of reception of the measurement data 255. In at least one embodiment, the multiplexer 200 adds at least one of the measurement data 255 of the embodiment of FIG. 1 and the ground positioning data 320 of the embodiment of FIG. 4.

In other words, according to an embodiment of the disclosure, there is provided a method for generating a Bluetooth™ data packet, the method comprising: receiving a location data from a GNSS receiver; by the GNSS receiver, simultaneously receiving a measurement data through a sensor port from a separate and distinct external measurement device; generating a Bluetooth™ data packet including, concurrently, the location data and the measurement data; and transmitting the Bluetooth™ data packet to an electronic device associated to the GNSS receiver, the electronic device being separate and distinct from the GNSS receiver.

FIG. 4 depicts the GNSS receiver 100 in communication with local positioning devices (or beacons) 300, in accordance with at least one embodiment of the present disclosure. The local positioning devices 300 may be located, for example, in a construction area, a mine or another open or closed site. For example, the local positioning devices 300 may be indoor positioning beacons.

In at least one embodiment, the GNSS receiver 100 is configured to communicate with the positioning devices 300 (such as, for example, beacons) via the wireless port 350 (the third port).

In operation, the receiver processor 212 of the GNSS receiver 100 is configured to analyze the quality of the GNSS signal. The receiver processor 212 determines that the GNSS signal is weak based on signal intensity, or that the GNSS location data is not accurate enough. The precision on the geolocation is also determined along with the geolocation itself, and may therefore exceed a determined threshold. The receiver processor 212 may alternatively simply determine that the precision is less than the precision on another concurrently and simultaneously used method for determining a location.

The technology as described herein permits to detect that the precision of the GNSS signal is not sufficient for positioning of the GNSS receiver 100 compared to positioning obtained with locally-installed beacons 300. Following this conclusion, the GNSS receiver 100 connects with local positioning devices 300 (such as, for example, beacons) and determines the positioning of the GNSS receiver 100 with respect to these local positioning devices.

In at least one embodiment, following determining that the GNSS signal is weak or inaccurate, the receiver processor 212 may request a wireless port 350 to verify whether there are any local positioning devices 300 (such as, for example, beacons which are also referred to herein as "beacons 300") located nearby. Alternatively, based on the computed ground positioning data 320 (from the signals received from local positioning devices 300 via the wireless port 350), the processor 212 may continuously compare such ground positioning data 320 with the GNSS data 265 (received from the GNSS port 260), as well as compare the precision data on the localization to be able to determine which source of geolocation (GNSS or local localization using beacons) has the greatest precision for a given geolocation at a given time. The wireless port 350 may have a Bluetooth™ profile suitable for indoor positioning or any wireless technology compatible with the local positioning devices 300 in use.

In at least one embodiment, after determining the position of the GNSS receiver 100 with respect to the local positioning devices 300, the GNSS receiver 100 (and, in particular, the multiplexer 200) generates the merged data 257. The merged data 257 comprises the adjusted position generated by combining or not the GNSS data 265 received from the GNSS port and ground positioning data 320 from the wireless port 350. The merged data 257, with the adjusted positioning, is then transmitted to the computer device 110. The adjusted position is transmitted in the same format as if the position data would be obtained by a conventional GNSS localisation method.

In at least one embodiment, the merged data 257 comprises either the GNSS data 265 received from the GNSS port or ground positioning data 320 from the wireless port 350. For example, the receiver processor 212 may determine, based on the marker 901 of the information block 310 that the GNSS data is not successfully measured, and then replace the GNSS data with the ground positioning data 320. For example, the receiver processor 212 may replace the string having the inaccurate coordinates in the first information block 310 with an adjusted coordinates string providing corrected (adjusted) coordinates based on the ground positioning data 320. In other terms, the third port 350 may communicate with an array of beacons, and the multiplexer 200 may generate a beacon-based position data and adjust the data packet based on the beacon-based position data.

According to an embodiment, the adjustment of the coordinates in the merged data 257 may be made by having the microcontroller of the GNSS receiver receive 1) the GNSS data (i.e., geolocation) over time (time series of locations) along with the precision data (simultaneous time series of geolocation precision); and 2) determine using the beacons 300 a location within the array of beacons, also with the associated precision based on the geometry of the array of beacons and signal intensity of the beacons 300. For each time stamp, the microcontroller 200 determines if the local array of beacons provides a better precision compared to the GNSS data 265, and, if yes, replaces the geolocation obtained from GNSS technology by the equivalent geolocation obtained from the array of beacons. Therefore, the data transmitted from the GNSS receivers 100 to electronic devices 110 seamlessly provides a stream of geolocation data which is always formatted as if it comes from the GNSS technology, even though some of the data may be replaced by non-GNSS location data. The replacement is indicated in the metadata to identify the data source. However, the format of the transmission should be seamless for the user and for the software applications on the electronic device 110 which receive, store, analyse, parse and use said continuously transmitted geolocation data stream to generate a map, for example.

According to an embodiment, the beacons 300, such as (without limitation) iBeacon™ types of beacon or other equivalents, should be installed at specifically known positions in an area (such as in an underground area, in a downtown area, etc.), such that the geolocation of each of the beacons 300 is known with high precision using a proper calibration during installation. The position of the GNSS receiver 100 within the array of beacons 301 should then be made using geometrical and physical assessments, such as using a directional Bluetooth™, assessing relative signal intensity (such as of a Bluetooth™ signal) between the GNSS receiver 100 and different nearby beacons 300, and performing a triangulation between them to locate the GNSS receiver 100 precisely within the array of beacons 301, which are the most nearby beacons 300, as determined from the relative signal intensity of the Bluetooth™ signal. The communication may be directional, i.e., the beacon 300 signals its presence to nearby electronic devices, or vice versa, or both. Each one of beacons of the array of beacons 301 is separate and distinct from the GNSS receiver, and each one of the beacons is installed at a pre-determined beacon location.

In at least one embodiment, after receiving a location data from the GNSS port 260, the multiplexer 200, and after determining that the GNSS precision data indicates that an adjustment is needed, the GNSS receiver 100 connects to an array of beacons 301, wherein each one of beacons of the array of beacons is separate and distinct from the GNSS receiver, and each one of the beacons is installed at a known location. Using at least one of triangulation and signal intensity, the receiver processor 212 may then determine a beacon-based location of the GNSS receiver 100 within the array of beacons 301, which is determined without GNSS technology. The receiver processor 212 may also determine a beacon estimated precision data. The data packet 257 may be generated having the location data from the GNSS receiver and the location data from the GNSS receiver may be replaced in the data packet with the beacon-based location of the GNSS receiver, as determined, if the beacon precision data is more accurate than the GNSS precision data.

Other techniques may be applied using other types of signals that may be either emitted by the GNSS receiver 100 or by the beacons 300, or received therefrom. The GNSS receiver as described herein may be used to communicate with the beacon(s) 300. FIG. 5 illustrates a GNSS receiver 500, in accordance with at least one embodiment, where the GNSS receiver 500 has, in addition to the GNSS port 260, a wireless port 350, the channel port 271, and the serial port 250 (in other terms, the "sensor port" which may be serial port 250 or a sensor Bluetooth™ port 271). The processor 212 of the GNSS receiver 500 communicates with both the sensor port and wireless port 350.

Figure 6:
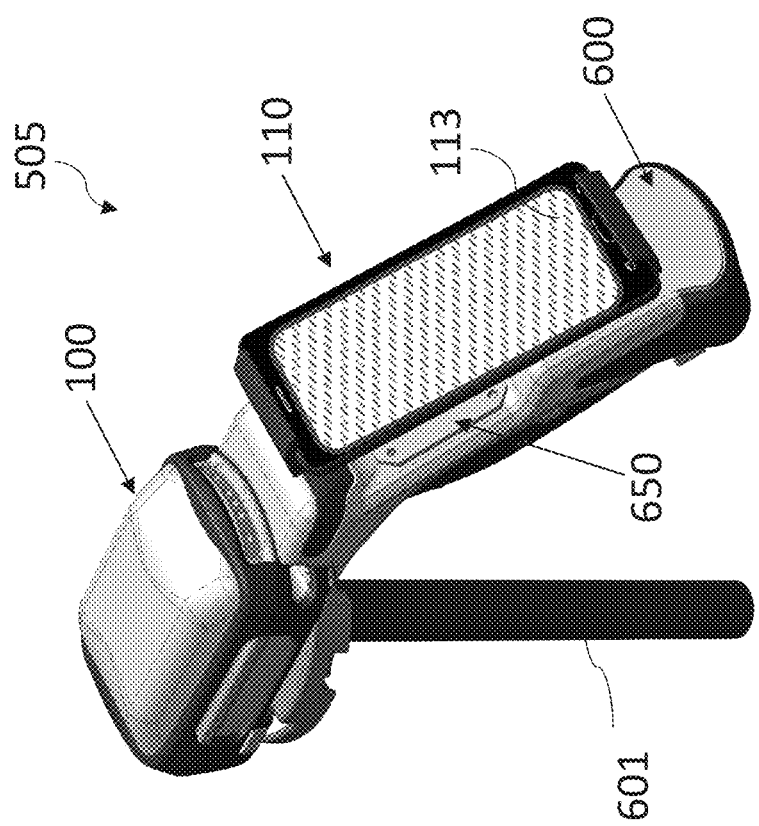
FIG. 6 depicts a GNSS receiver and a handle combined together and mounted on a pole, with an electronic device mounted thereon on a dedicated socket, in accordance with the embodiments of the present disclosure.

FIG. 6 illustrates that the GNSS receiver 100 may be mounted on a pole 601 using a socket therefor. The GNSS receiver 100 may further comprise a handle 600 inserted into the housing of the GNSS receiver 100. Another socket—device socket 650 in the handle 600—may be used to mount (receiving and fixating thereto) the electronic device 110 associated to the GNSS receiver 100. This ensures good handleability and modularity of the combined GNSS receiver 100 and the electronic device 110. In at least one embodiment, the electronic device 110 associated to the GNSS receiver 100 is installed on the handle 600 inserted into the GNSS receiver 100.

This way, the electronic device 110 may be mechanically secured in close proximity to the GNSS receiver 100, and detached or released if needed. This close proximity ensures that any one of the GNSS receiver 100 or the electronic device 110 associated thereto may be used to communicate with the beacons 300 in the array of beacons 301 for localization in areas where GNSS reception is poor. However, using the GNSS receiver 100 for such a communication is preferred in view of the multiplexing described herein which the present disclosure proposes integrating into the GNSS receiver 100.

This associated electronic device 110 is the one to which the GNSS data is fed along with other measurements from external measurement devices 120 (illustrated in FIG. 1). Therefore, the GNSS receiver 100 may collect external data other than the GNSS data from the external measurement devices 120 (performing physical or chemical measurements, for example) and feed the associated electronic device 110 with all data combined, concurrently. Therefore, if the external measurement devices 120 are incompatible with the associated electronic device 110 (e.g., not same generation or same type of Bluetooth™, or no Bluetooth™ connectivity on the external measurement devices), the GNSS receiver may use a more low-level/legacy or otherwise compatible Bluetooth™ technology to collect data from said external measurements devices 120, or may be wired to them using appropriate wired connection ports on the GNSS receiver 100 that the associated electronic device 110 most probably lacks. The GNSS receiver 100, with its microcontroller (receiver processor 212), may then combine the data from the GNSS satellites 114 and the external sensor data (measurement data 255) and send the resulting data packet (merged data 257) to the associated electronic device 110 over a compatible Bluetooth™ technology such as one which is compatible with the iOS™ operating system for Apple™ devices, for which the external measurement devices 120 are not directly compatible with respect to Bluetooth™ connectivity. Thereby, the GNSS receiver 100 serves as an intermediate between devices for which direct communication is incompatible, while also adding the advantage of increasing the precision in mapping the data measured by external measurement devices 120 because the data measured by external measurement devices 120 is simultaneously integrated to (with) the actual geolocation measurements from a high-precision GNSS technology.

This same technology may be beneficial if used concurrently with external devices such as location beacons 300 that are pre-installed each with a known location to provide for a replacement or corrective location to be used in areas where the GNSS technology has a poor precision due to physical features of the environment (underground, nearby skyscrapers, etc.).

Figure 7A:
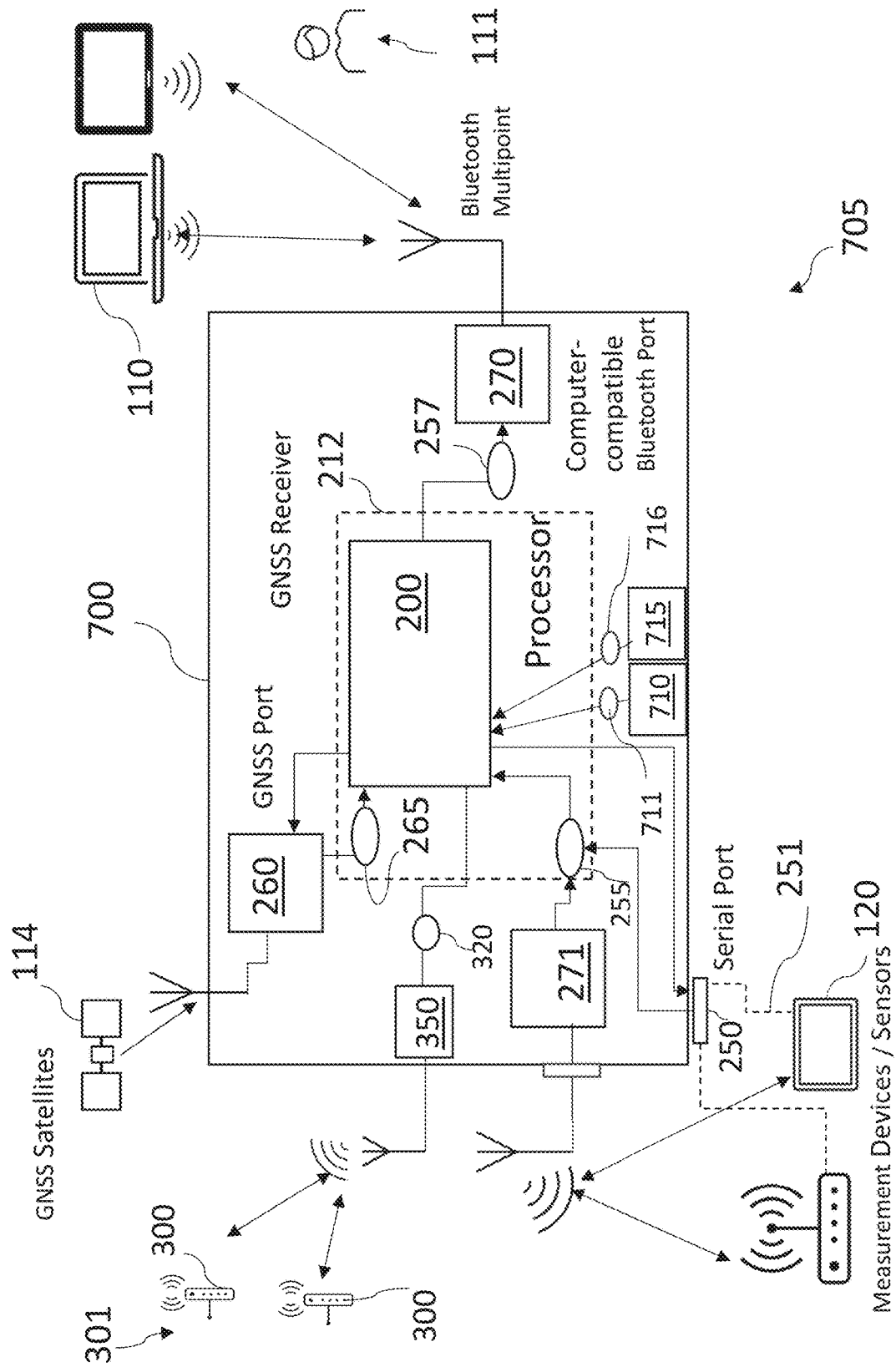
FIGS. 7A, 7B illustrate the GNSS receivers, in accordance with other embodiments of the present disclosure.
Figure 7B:
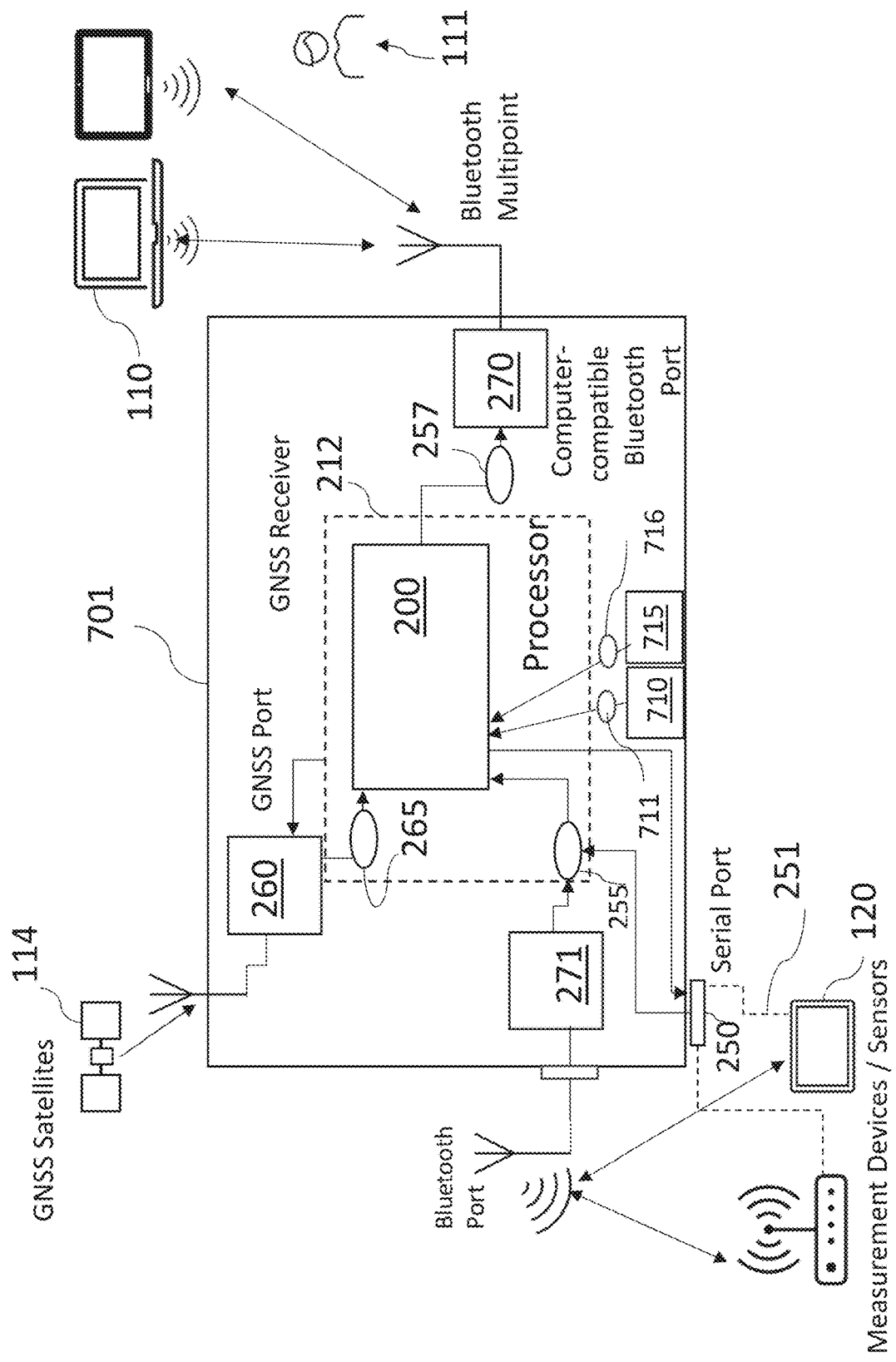

FIGS. 7A, 7B illustrate other embodiments of the GNSS receivers 700, 701. In at least one embodiment, the GNSS receivers 700, 701 each have the GNSS port 260 and the channel port 271 (and/or serial port 250) as described above. In some other embodiments, the GNSS receiver 700 may also have wireless port 350 for communication with the beacons 300.

Figure 8B:
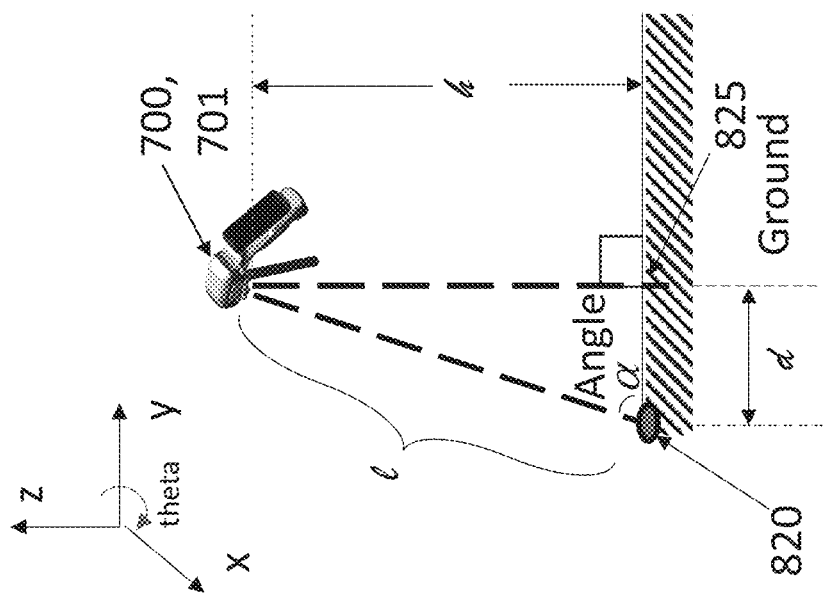
FIGS. 8A, 8B illustrate the GNSS receivers of FIGS. 7A, 7B and their operation, in accordance with at least one embodiment of the present disclosure.
Figure 8A:
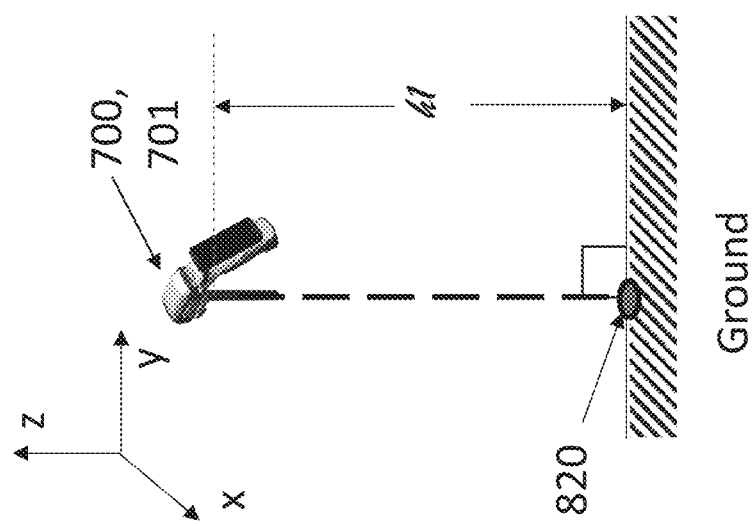

In the embodiments illustrated in FIGS. 7A, 7B, the GNSS receivers 700, 701 also comprise an inertial sensor 710, configured to measure the acceleration and angular velocity of an object along three mutually perpendicular axes. In at least one embodiment, the GNSS receivers 700, 701 may further comprise a laser 715 that is configured to measure a distance between the receiver 700, 701 and a laser measurement spot 820 on the ground as illustrated in FIGS. 8A, 8B. In at least one embodiment, the laser 715 may measure the distance between the measurement spot 820 and the laser 715 (and, therefore, measure the distance between the measurement spot 820 and the receiver 700, 701 using the emitted, reflected and collected laser light beam).

For example, the laser measurement spot 820 may be located right below the receiver 100 (FIG. 8A), and therefore the coordinate (x, y) of the receiver 100 is the same as the coordinate of the laser measurement spot 820. In such an example, measuring the distance h1 between the measurement spot 820 and the receiver 700, 701 by the laser 715 may thus help to determine the z-coordinate of the receiver 700, 701. In some other embodiments, the measurement spot 820 may be located at a distance (offset) d from the position 825 located right under the receiver (FIG. 8B), and, by using a combination of data received from the inertial sensor 710 and the laser 715, the receiver 700, 701 may determine the location (geolocation) of the measurement spot 820.

The receiver 700, 701 may have a push-button, or pull trigger, that is configured to enable, and, later, disable, operation of the laser 715. In response to the user pushing such a push-button or other similar actuator, the laser 715 of the receiver 700, 701 is configured to measure the distance between the measurement spot 820 and the receiver 700, 701. The laser 715 then transmits the laser measurement data 716 to the receiver processor 212 which determines a distance from the time or spectrum data in the collected laser data. In addition, the inertial sensor 710 also transmits the inertial sensor data 711 to the receiver processor 212 for simultaneous processing, where the simultaneous nature of the multiple data collection (distance from laser and inertial data) may be useful to make further determinations as detailed below.

Based on the data received from the laser 715 and the inertial sensor 710, the processor 212 of the receivers 700, 701 may be used to determine a tilt in real time and compensate, also in real time and dynamically as the apparatus moves, for the evolving tilt of the receivers 700, 701 and therefore for the difference between l and h, in order to correctly record the vertical positioning of the receivers 700, 701 with respect to the ground. In other terms, processor 212 helps to correctly determine the height h in FIG. 8B. The tilt at an angle α as illustrated in FIG. 8B may be determined by the processor 212, and then a real position (coordinates, including the z-coordinate) on the ground of the measurement spot 820 may be calculated by the processor 212 based on the data received from the inertial sensor 710, data received from the laser 715 (e.g. the distance between the receiver 700, 701 and the ground), and the data (coordinates) received from the GNSS sensor 260. Such tilt compensation may be performed by the microcontroller 200. The microcontroller 200 may then transmit the merged data 257 with corrected (adjusted) coordinates towards the computer-compatible Bluetooth™ port 270. In some embodiments, the microcontroller 200 may transmit the corrected (adjusted) coordinates along with (and, in some embodiments, without) the sensor data in the merged data 257 towards the computer-compatible Bluetooth™ port 270.

In at least one embodiment, the measurements with the laser 715 may also permit to determine the position (coordinates) of the measurement spot 820 in FIG. 8B. For example, the measurement spot 820 may be located at the distance d from the position (on the ground) of the receiver 700, 701. The receiver processor 212 may receive the laser measurement data 716 and the inertial sensor data 711, and calculate the offset d and the position of the measurement spot 820 vis-à-vis the position 825 in the xy surface (for example, angle theta). Based on the received data of the coordinates of the receiver 700, 701 from the GNSS port 260, the receiver processor 212 may thus determine, on demand, the coordinates of the measurement spot 820. For example, the determined coordinates of the measurement spot 820 may be then transmitted to the computer-compatible port 270 with or without the data received from the serial port 250 from the sensors 120. When the coordinates of the measurement spot 820 are transmitted with the data received from the serial port 250 from the sensors 120, the receiver processor 212 generates the merged data 257 as described above. Nevertheless, the receiver processor 212 may transmit the data with the coordinates of the measurement spot 820 to the computer-compatible port 270 without the data received from the sensors 120. In some embodiments, the coordinates of the measurement spot 820 may be also determined based on the data 320 received from the local positioning devices 300, in addition to the GNSS data 265, and the offset determined based on the laser measurement data. Thus, the microcontroller 200 of the receiver 700, 701 may be configured to determine the position of the receiver 700, 701, and the position of the measurement spot 820, even if the measurement spot is shifted away from the position 825 located right under the receiver 700, 701 on the ground. The receiver 700, 701 may thus operate with or without a post (ranging pole) that would fix the distance between the ground and the receiver 700, 701.

As mentioned above, the receiver processor 212 is configured to generate the merged data 270 in real time. In at least one embodiment, the processor 212 is configured to generate the merged data 257 each time it receives the GNSS data 265 and/or measurement data 255 and/or data 320 from the wireless port 350. The processor may also adjust the location data (that is transmitted in the merged data 257), based on the current (real time) measurements of the distance by the laser 715 and real-time measurements of the inertial sensor 710, thereby adjusting the tilt in real time, dynamically as the apparatus moves in space and angle, and also thereby determining the height (altitude) also in real time and dynamically for simultaneous recording along with the x,y coordinates and, if applicable, with other external data from external sensors. In at least one embodiment, the GNSS data 265, as it is received by the receiver processor 212 with a sequence of information blocks (such as the first information block 310), forms the base of the merged data 257, because the information blocks 311 may be received more frequently than any other data by the receiver processor 212. In such embodiment, the merged data 257 which is based on the GNSS data 265, is adjusted when at least one of the measurement data 255, ground positioning data 320, inertial sensor data 711, and laser measurement data 716 is received by the receiver processor 212.

In at least one embodiment, the multiplexer 200 may convert the inertial sensor data 711 and/or laser measurement data 716 to an adjusted location string which starts, for example, with a sensor identifier (for example, a tilt sensor may be identified as "$TILT") and then append the adjusted location string after the first information block 310 or prior to the next (second) information block 310, and following the other strings provided by the other sensors within a time period related to the first information block 310.

The multiplexer 200 as described herein may be configured to generate a data packet based on the geolocation data 265 which has the sequence of the information blocks. In response to receiving the measurement data from the first port, the multiplexer 200 may generate a measurement data block (which may comprise, for example, an identifier and may be, for example, a string) and adjust the data packet 257 by inserting the measurement data block 255' between two sequential information blocks 310, 312 of the sequence of information blocks of the GNSS data 265. The multiplexer 200 may generate a tilt data block based on the inertial sensor data the and the laser measurement data and then adjust the data packet by inserting the tilt data block between the neighboring information blocks. For example, each information block may have an information block timestamp, and the measurement data may have a measurement timestamp. The multiplexer 200 may compare the information block timestamp and the measurement timestamp. The multiplexer 200 may adjust the data packet such that the information block timestamp and the measurement timestamp of a measurement data block 255' which follows the information block are simultaneous with or within a pre-determined time period.

Referring to FIGS. 5 and 7A, the system 505, 705 for communication of geolocation of a measurement data comprises: the GNSS port 260 configured to generate a geolocation data (for transmission using a first port 270 using the first communication technology such as, for example, Bluetooth™ or wi-fi) comprising a sequence of information blocks 311; the second port 271, 251 configured to communicate with the measurement device 120 using the second communication technology (such as, for example, Bluetooth™ or wi-fi) and to generate the measurement data 255; the first port 270 configured to communicate with an electronic device 110 using the first communication technology (such as, for example, Bluetooth™ or wi-fi), the measurement device being distinct from the electronic device, and the first communication technology being incompatible with the second communication technology; and the microcontroller 200 configured to: generate a data packet based on the geolocation data having the sequence of the information blocks 311; in response to receiving the measurement data from the second port, generate a measurement data block and adjust the data packet by inserting the measurement data block between two sequential information blocks of the sequence of information blocks; and transmit the data packet 257 to the first port 2 for transmission to the electronic device. The data packet may be adjusted by inserting the tilt data block therein. The system may further comprise the computer device processor 112 configured to parse the data packet 257 received from the first port 270 and generate the visual representation of the measurement data with respect to a measurement location. The system 505, 705 may further comprise a third port configured to communicate with an array of beacons, wherein the microcontroller is configured to generate the beacon-based position data as described above and to adjust the data packet based on the beacon-based position data.

FIG. 9 illustrates a method 900 for generating a data packet over Bluetooth, in accordance with at least one embodiment of the present disclosure. At step 910, a location data from the GNSS port is received. At step 912, by the GNSS receiver 100, the measurement data through at least one of a Bluetooth™ channel and the serial port from the external measurement device 120 are received simultaneously (or, in some embodiment, within a pre-determined time period). At step 914, a data packet 257 is generated comprising, concurrently, the location data (identifying the location received in the information blocks 311 of the GNSS data 265) and the measurement data 255. At step 916, the data packet 257 is transmitted over Bluetooth™ via a computer-compatible (Bluetooth™) port 270 of the GNSS to an electronic device paired to the GNSS receiver.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for generating a data packet for transmission using a first short-range communication technology, the method comprising:
receiving a location data from a Global Navigation Satellite Systems (GNSS) port;
by a GNSS receiver, simultaneously receiving a measurement data using a second short-range communication technology from an external measurement device;
generating a data packet comprising, concurrently, the location data and the measurement data; and
transmitting the data packet using the first short-range communication technology via a computer-compatible port to an electronic device paired to the GNSS receiver using the first short-range communication technology.

2. The method of claim 1, wherein the external measurement device compatible with the second short-range communication technology of the electronic device associated to the GNSS receiver, the second short-range communication technology being different from the first short-range communication technology and the GNSS receiver is an intermediate for communication therebetween.

3. The method of claim 1, further comprising simultaneously mapping the measurement data received from the external measurement device with the location data received from a GNSS receiver.

4. The method of claim 1, wherein the electronic device associated to the GNSS receiver is installed on a handle inserted into the GNSS receiver.

5. The method of claim 1, wherein the electronic device is separate and distinct from the GNSS receiver.

6. The method of claim 1, further comprising adjusting the data packet using ground positioning data received from an array of beacons, wherein each one of beacons of the array of beacons is separate and distinct from the GNSS receiver.

7. The method of claim 1, further comprising adjusting the data packet using an inertial sensor data received from an inertial sensor located in the GNSS receiver.

8. The method of claim 1, further comprising further adjusting the data packet using laser measurement data received from a laser located in the GNSS receiver.

9. The method of claim 1, wherein the first short-range communication technology is a first Bluetooth™ technology and the second short-range communication technology is a second Bluetooth™ technology.

10. A method for determining a geolocation of a measurement spot, the method to be executed by a Global Navigation Satellite Systems (GNSS) receiver being in communication with an array of beacons and having a GNSS port, the method comprising:
   receiving a location data from the GNSS port, along with a GNSS precision data;
   by the GNSS receiver, connecting to the array of beacons, wherein each one of beacons of the array of beacons is separate and distinct from the GNSS receiver, and each one of the beacons is installed at a pre-determined beacon location;
   determining a beacon-based location of the GNSS receiver within the array of beacons along with a beacon estimated precision data;
   generating a data packet having the location data received from the GNSS port, comprising replacing the location data from the GNSS port in the data packet by the beacon-based location of the GNSS receiver if the beacon estimated precision data is more accurate than the GNSS precision data; and
   transmitting the data packet over an output port to an electronic device associated to the GNSS receiver, the electronic device being separate and distinct from the GNSS receiver.

11. The method of claim 10, further comprising measuring a distance to the measurement spot located on a ground and, based on the distance, adjusting the location data.

12. The method of claim 10, further comprising adjusting the data packet based on an inertial sensor data received from an inertial sensor located in the GNSS receiver.

13. The method of claim 10, further comprising adjusting the data packet based on a distance between the GNSS receiver and the measurement spot, the distance being determined based on a laser measurement data received from a laser located in the GNSS receiver.

14. The method of claim 10, wherein connecting to the array of the beacons is in response to the GNSS precision data indicating that the location data received from the GNSS port needs to be corrected.

15. An apparatus for determining a location of a measurement spot, the apparatus comprising:
   a Global Navigation Satellite Systems (GNSS) port;
   a channel port configured to communicate with a measurement device and generate measurement data;
   a computer-compatible port configured to communicate with a computer device, the measurement device being distinct from the computer device and the measurement device not being adapted to communicate with the computer device directly; and
   a microcontroller configured to:
      receive, from the GNSS port, a GNSS data;
      generate a merged data packet comprising the GNSS data and the measurement data; and
      transmit the merged data packet to the computer device.

16. The apparatus of claim 15, further comprising an inertial sensor configured to measure an inertial sensor data and wherein the microcontroller is further configured to adjust the merged data packet based on the inertial sensor data.

17. The apparatus of claim 15, further comprising a laser configured to measure a distance between the apparatus and the measurement spot and wherein the microcontroller is further configured to adjust the merged data packet based on a laser measurement data received from the laser.

18. The apparatus of claim 15, further comprising a handle comprising a device socket for mounting the computer device associated to the apparatus.

19. A system for communication of geolocation of a measurement data, the system comprising:
   a Global Navigation Satellite Systems (GNSS) port configured to generate a geolocation data comprising a sequence of information blocks;
   a first port configured to communicate with an electronic device using a first communication technology;
   a second port configured to communicate with a measurement device using a second communication technology and to generate the measurement data, the measurement device being distinct from the electronic device, and the first communication technology being incompatible with the second communication technology; and
   a microcontroller configured to:
      generate a data packet based on the geolocation data having the sequence of the information blocks;
      in response to receiving the measurement data from the second port, generate a measurement data block and adjust the data packet by inserting the measurement data block between two sequential information blocks of the sequence of information blocks; and
      transmit the data packet to the second port for transmission to the electronic device.

20. The system of claim 19, further comprising an inertial sensor and a laser, and wherein the microcontroller is further configured to generate a tilt data block based on an inertial sensor data the and a laser measurement data and to adjust the data packet by inserting the tilt data block.

* * * * *